United States Patent [19]

Walenty et al.

[11] Patent Number: 5,173,860
[45] Date of Patent: Dec. 22, 1992

[54] REFERENCE SPEED DETERMINATION FOR AN ANTILOCK BRAKE SYSTEM

[75] Inventors: Allen J. Walenty, Mt. Clemens; Alexander Kade, Grosse Pointe Woods; Shahram Zarei, Auburn Hills, all of Mich.

[73] Assignee: General Motors Corporation, Detroit, Mich.

[21] Appl. No.: 646,027

[22] Filed: Jan. 28, 1991

[51] Int. Cl.$^5$ .................................................. B60T 8/32
[52] U.S. Cl. ................................ 364/426.02; 303/103; 303/109
[58] Field of Search ................... 364/426.02, 426.03, 364/565; 324/160, 166; 303/95, 109, 100, 102, 103, 105, 106; 180/197

[56] References Cited

U.S. PATENT DOCUMENTS

| | | | |
|---|---|---|---|
| 4,358,164 | 11/1982 | Bleckmann et al. | 303/93 |
| 4,762,375 | 8/1988 | Maki et al. | 303/96 |
| 4,805,103 | 2/1989 | Matsuda | 364/426.02 |
| 4,809,182 | 2/1989 | Matsuda | 364/426.02 |
| 4,852,951 | 8/1989 | Matsuda | 303/100 |
| 4,877,295 | 10/1989 | Yoshino | 364/426.02 |
| 4,916,619 | 4/1990 | Walenty et al. | 364/426.02 |
| 4,970,649 | 11/1990 | Matsuda | 364/426.02 |
| 4,974,163 | 11/1990 | Yasuno et al. | 364/426.02 |
| 4,991,103 | 2/1991 | Lin | 364/426.02 |
| 4,991,910 | 2/1991 | Shimanuki et al. | 364/426.02 |
| 5,028,095 | 7/1991 | Okubo | 303/103 |
| 5,033,799 | 7/1991 | Braschel | 303/109 |
| 5,092,662 | 3/1992 | Okubo | 364/426.02 |

FOREIGN PATENT DOCUMENTS

0240287A3  7/1987  European Pat. Off. .
1592932    7/1981  United Kingdom .

Primary Examiner—Gary Chin
Attorney, Agent, or Firm—Howard N. Conkey

[57] ABSTRACT

A vehicle antilock control system provides for selectively enabling the rear wheels of a vehicle to freewheel and thereby attain vehicle velocity to provide an accurate measure of the vehicle speed during antilock controlled braking.

8 Claims, 5 Drawing Sheets

REFERENCE SPEED DETERMINATION FOR AN ANTILOCK BRAKE SYSTEM

BACKGROUND OF THE INVENTION

This invention relates to a vehicle antilock control system and method and specifically to a system and method of determining a vehicle reference speed in an antilock brake control system.

When the brakes of a vehicle are applied, a braking force is generated between the wheel and the road surface that is dependent upon various parameters which include the road surface condition and the amount of wheel slip between the wheel and the road surface. This braking force increases as slip increases until a critical value of slip is reached. Beyond the critical value of slip, the braking force decreases and the wheel rapidly approaches lockup. Therefore, to achieve stable braking, an antilock control system seeks to operate wheel slip at or near the critical slip value. An antilock control system achieves this objective by detecting an incipient wheel lockup condition and releases pressure at the wheel brake to allow recovery from the incipient wheel lockup condition. Criteria typically used to indicate an incipient wheel lockup condition includes excessive wheel slip.

Since wheel slip is the relative difference between vehicle speed and wheel speed, any inaccuracies in the determination of the reference speed representing the vehicle speed will result in inaccuracies in the computed wheel slip.

A method for establishing the vehicle speed reference based on wheel speed information provides for allowing one of the wheels of the vehicle during antilock controlled braking to free-wheel so as to assume a speed equal to the vehicle speed. This is accomplished by maintaining lower braking forces on the selected wheel to allow the wheel to accelerate to the vehicle speed. This speed then provides an accurate estimate of the vehicle speed and may be utilized to accurately compute the wheel slip values upon which antilock control braking is based. This invention is directed to this form of determining an accurate vehicle reference speed during antilock controlled braking.

SUMMARY OF THE INVENTION

This invention provides for an improved method of establishing a vehicle speed reference in a vehicle antilock brake control system.

In general, this invention provides for selectively enabling the rear wheels of a vehicle to free-wheel and thereby attain vehicle velocity to provide an accurate measure of the vehicle speed during antilock controlled braking.

In accord with one aspect of the invention, the brake pressure applied to a selected one of the vehicle rear wheels is released until such time that deceleration of the wheel is detected indicating that the wheel has attained a velocity substantially representing vehicle velocity. This speed then provides an accurate measure of the vehicle reference speed for antilock controlled braking.

In yet another aspect of the invention, the selected wheel for establishing the vehicle velocity reference is caused to free-wheel at a point in the antilock brake control cycle at which the wheel is already close to the actual vehicle speed thereby minimizing the free-wheeling time. Specifically, the brake pressure applied to the selected wheel is set to zero at a point just before the reapply portion of the pressure control cycle following release of brake pressure in response to an incipient lockup condition thereby minimizing the time required for the wheel to attain vehicle velocity.

In another aspect of this invention, the rear wheels of the vehicle are alternately selected for establishing the vehicle reference speed by free-wheeling to avoid the occurrence of both rear wheels free-wheeling at the same time so as to provide uniform braking on a straight path and, in the case where a single vehicle speed reference is provided for both sides of the vehicle, to provide for for canceling of the slip error associated with free-wheeling only on the inside or outside of the vehicle while traversing a curved roadway.

In yet another aspect of the invention, the rear wheels are enabled to be free-wheeled to establish the vehicle velocity reference only when the coefficient of friction between the wheel and road surface is below a predetermined value indicating a slippery road surface. This provides for minimum impact on the braking efficiency of the vehicle.

In yet another aspect of the invention, when one wheel is on a low coefficient of friction surface while the other is on a high coefficient of friction surface, only the wheel on the low coefficient of friction surface is free wheeled to provide a measure of the reference vehicle speed. Only when both wheels are operating on a surface having a relatively low coefficient of friction are the wheels alternately free wheeled to provide a measure of the vehicle speed reference.

DESCRIPTION OF THE DRAWINGS

The invention may be best understood by reference to the following description of a preferred embodiment and the drawings in which.

DESCRIPTION OF THE PREFERRED EMBODIMENT

Figure 1:
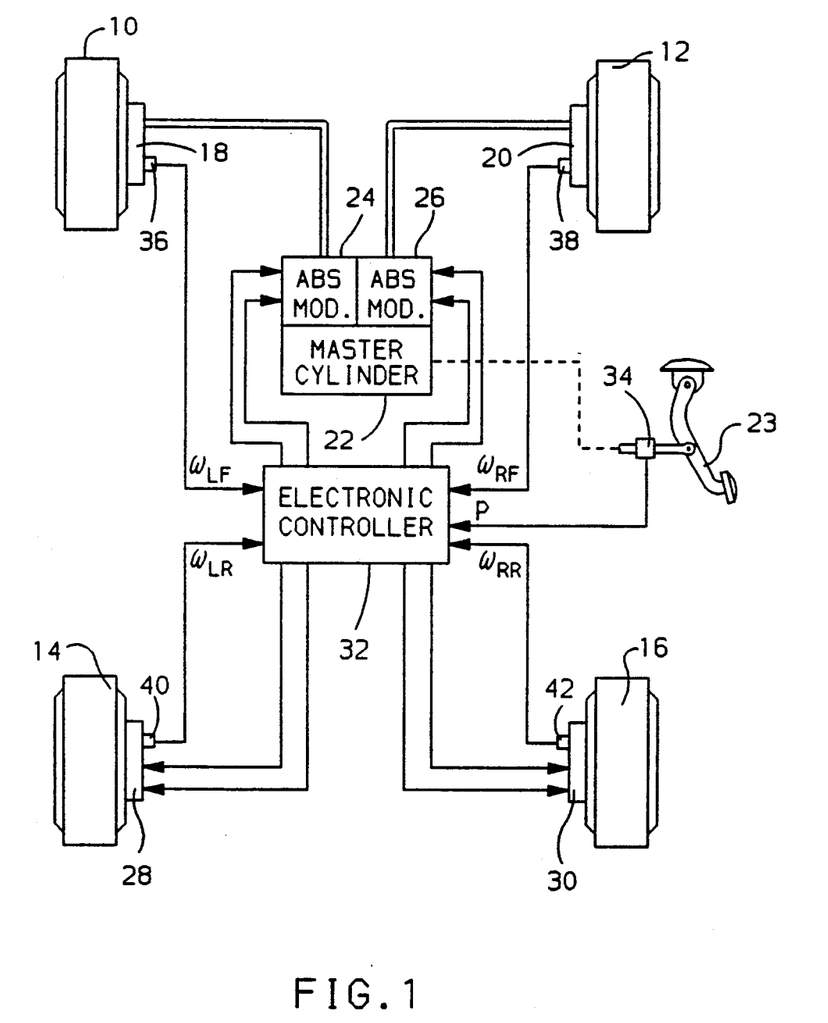
FIG. 1 is a diagram of a wheel braking system including an electronic controller for controlling the vehicle rear wheel brakes and for limiting the wheel brake pressures of the front and rear brakes for antilock brake control.

A vehicle braking system is illustrated in FIG. 1. In general, the vehicle includes left and right front driven wheels 10 and 12 and left and right rear non-driven wheels 14 and 16. The front wheels 10 and 12 have respective hydraulic actuated brakes 18 and 20 actuated by hydraulic pressure generated via a conventional master cylinder 22 operated by a brake pedal 23. The brakes 18 and 20 are operated through a pair of antilock brake system pressure modulators 24 and 26. In the preferred form, the modulators 24 and 26 take the form of a motor driven pressure modulator in which a piston is controlled by operation of a DC motor to modulate brake pressure. These pressure modulators may take the form of the modulator as illustrated in U.S. Pat. No. 4,917,445 issued on Apr. 17, 1990, and assigned to the assignee of this invention. In general, these modulators are transparent to the braking system during normal braking of the wheels 10 and 12 and are operable to limit brake pressure during antilock controlled braking In this embodiment, the rear wheels 14 and 16 include a pair of electrically operated brakes 28 and 30. The brakes 28 and 30 may each take the form of an electronically operated drum brake in which braking torque is established by operation of a DC torque motor and at a value proportional to the torque output of the DC torque motor.

The electric brakes 28 and 30 and the antilock brake system pressure modulators 24 and 26 are controlled by means of an electronic controller 32. In general, the controller 32 responds to the brake pressure P applied to the brake pedal 23 by the vehicle operator as measured by a force transducer 34 and controls the current to the torque motors of the electric brakes 28 and 30 so as to establish a braking pressure proportional to the pressure at the front wheel brakes 18 and 20. Further, the electronic controller 32 controls the electric brakes 28 and 30 and the antilock brake system pressure modulators 24 and 26 so as to limit the brake pressure applied to any one of the wheels 10, 12, 14 and 16 to prevent wheel lockup.

In regard to the antilock brake control function of the electronic controller 32, the controller monitors the wheel speeds $\omega_{LF}$ and $\omega_{RF}$ of the left and right driven wheels 10 and 12 via speed sensors 36 and 38 and the wheel speeds $\omega_{LR}$ and $\omega_{RR}$ of the left and right undriven wheels 14 and 16 via speed sensors 40 and 42. The wheel speed assemblies are standard and may take the form of speed sensors typically used in antilock control systems for monitoring wheel speed. Typically, these systems may be comprised of an exciter ring which is rotated with the wheel and an electromagnetic sensor which monitors the rotation of the exciter ring to provide a signal having a frequency proportional to wheel speed. The electronic controller 32 then measures the frequency to establish the respective wheel speed.

The electronic controller 32 takes the form of a standard digital computer such as a Motorola MC68HC11 microcomputer along with the standard interface and driver circuits for interfacing and conditioning the input and output signals. For example, the wheel speed signals may be provided to a conventional interface and squaring circuit to be provided to the input of the microcomputer. Additionally, the output motor commands of the microcomputer may be provided to motor driver interface and an H-switch drivers to provide signals for controlling the motors associated with the modulators 24 and 26 and the motors associated with the electric brakes 28 and 30. The driver interface and H-switch driver for controlling the motors may take the form of the driver illustrated in the U.S. Pat. No. 4,835,695, issued May 30, 1989.

The operation of the electronic controller 32 in controlling the motors associated with the antilock brake system pressure modulators 24 and 26 and the electric brakes 28 and 30 in accord with this invention is illustrated in the FIGS. 2-5. The microcomputer contained within the electronic controller 32 has stored therein the instructions necessary to implement the algorithm as diagrammed in those figures.

Figure 2:
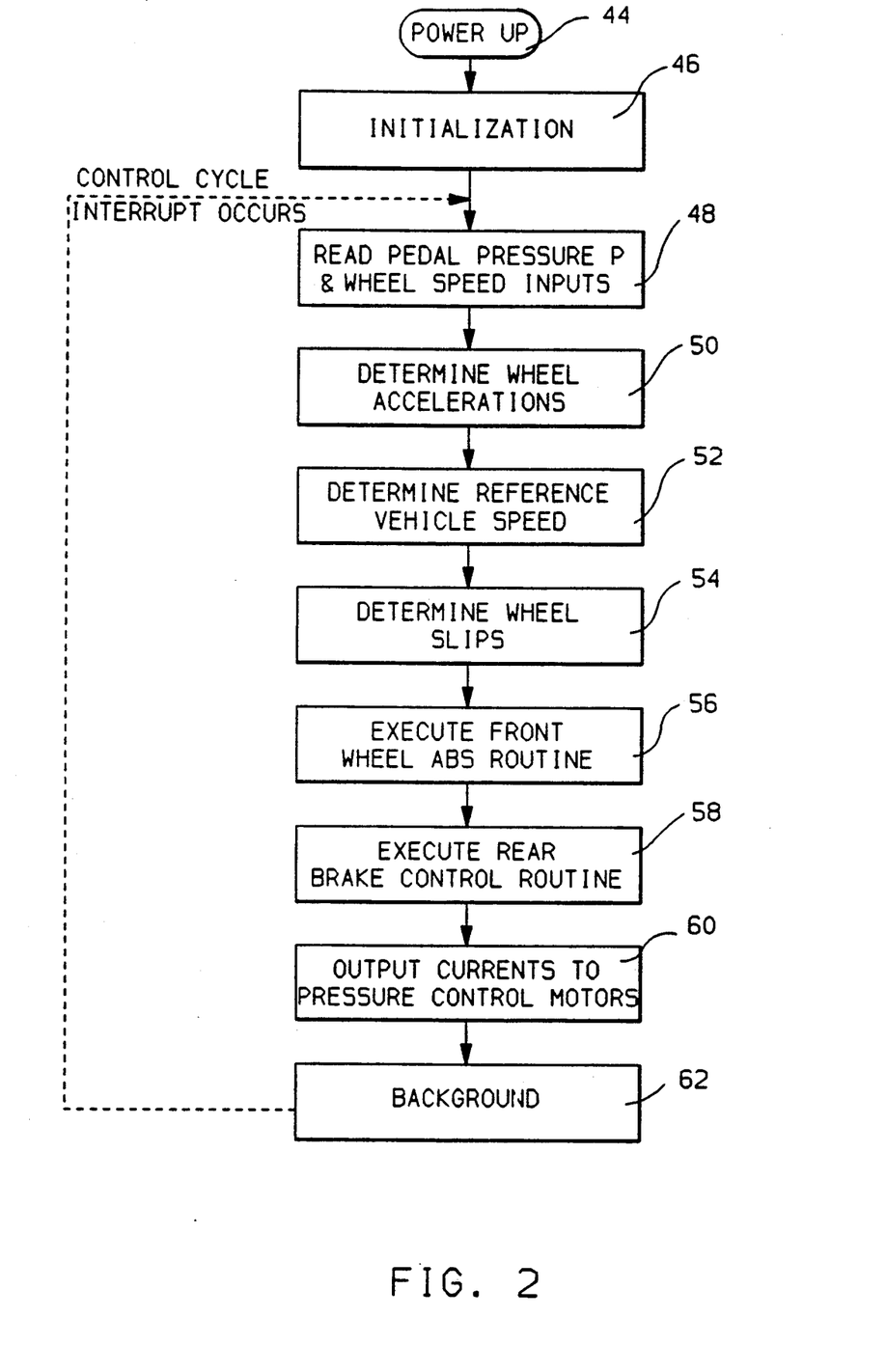
FIGS. 2-5 are flow diagrams illustrating the operation of the electronic controller of FIG. 1 in accord with the principles of this invention.

Referring first to FIG. 2, when power is first applied to this system from a vehicle battery (not shown), the computer program is initiated at a point 44 and then provides for system initialization at step 46 which entails clearing registers, initializing various random access memory variables to calibrated values and other functions. When the initialization routine is completed, the program then proceeds to perform brake control functions as required. These functions are performed by executing a control cycle in response to each of repeated control cycle interrupts which are generated by the microcomputer at predetermined fixed time intervals such as 8 milliseconds. Upon the occurrence of a control cycle interrupt, the microcomputer begins executing the functions embodied in the control cycle First, at step 48, the controller reads the pressure P of the pressure applied by the operator to the brake pedal 23 and also reads the wheel speed inputs from the speed sensors 36, 38, 40 and 42 and computes the speeds of the individual wheels 10, 12, 14 and 16. Thereafter, the routine determines the individual wheel acceleration at step 50. The program then estimates vehicle speed at step 52. While in one embodiment a single reference vehicle speed may be determined, in the preferred form, a separate reference vehicle speed is determined for each side of the vehicle in order to provide an accurate representation of vehicle speed associated with each side of the vehicle while traveling over a curve in the roadway. These speeds are utilized during antilock brake controlled braking in the determination of wheel slip. In general, the reference vehicle speeds are based upon the monitored speeds of the respective rear wheels 14 and 16. As will be described, by providing for selective free-wheeling of the rear wheels 14 and 16, the vehicle speed references established at step 52 may accurately depict the actual vehicle speed for each side of the vehicle even during antilock controlled braking of all of the vehicle wheels.

At step 54, the program provides for determining individual wheel slips based upon the actual measured wheel speeds at step 48 and the respective reference vehicle speed established by step 52. The reference vehicle speed for the left side of the vehicle is used to determine the slip of the left wheels 10 and 14 while the reference vehicle speed for the right side of the vehicle is used to determine the slip of the right wheels 12 and 16. By accurately determining vehicle speed in accord with this invention, accurate indications of wheel slips are determined at step 54 to enhance antilock controlled braking.

At step 56, the electronic controller 32 executes a front wheel antilock brake routine for limiting the brake pressure applied to the front wheel brakes 18 and 20 to prevent wheel lockup. This control is standard in form and provides for sensing an incipient lockup of a wheel based upon parameters including its slip as determined at step 54 and its acceleration as determined at step 50, releasing brake pressure to allow recovery from the incipient lockup condition and reapplying brake pressure when wheel recovery is sensed. As previously indicated, this control is based on an accurate indication of wheel slip based upon an accurate representation of vehicle speed determined in accord with this invention to thereby maximize braking efficiency during antilock controlled braking.

The rear brakes are next controlled at step 58 and includes establishing the braking pressure during normal braking as represented by pressure applied to the brake pedal 23 and further provides for limiting the braking pressure to prevent wheel lockup. This routine further provides for selective free-wheeling of the rear wheels 14 and 16 during antilock controlled braking so as to enable step 52 to establish an accurate measurement of the left and right side reference vehicle speeds.

At step 60, the program outputs the respective motor current commands to the pressure control motors associated with the antilock brake pressure modulators 24 and 26 and the electric brakes 28 and 30 to establish the desired braking characteristics. Thereafter, the program proceeds to perform background tasks at step 62. These tasks may include diagnostic functions as well as other functions. The foregoing steps 48-62 are repeated once for each control cycle. Thus, when a control cycle interrupt occurs, a new cycle begins at step 48 and the functions represented by steps 48 through 62 are again repeated as previously described. Repeated executions of those steps provide for control of the rear brakes 28 and 30 and provide for antilock controlled braking of each of the wheels 10, 12, 14 and 16 as required.

Figure 3:
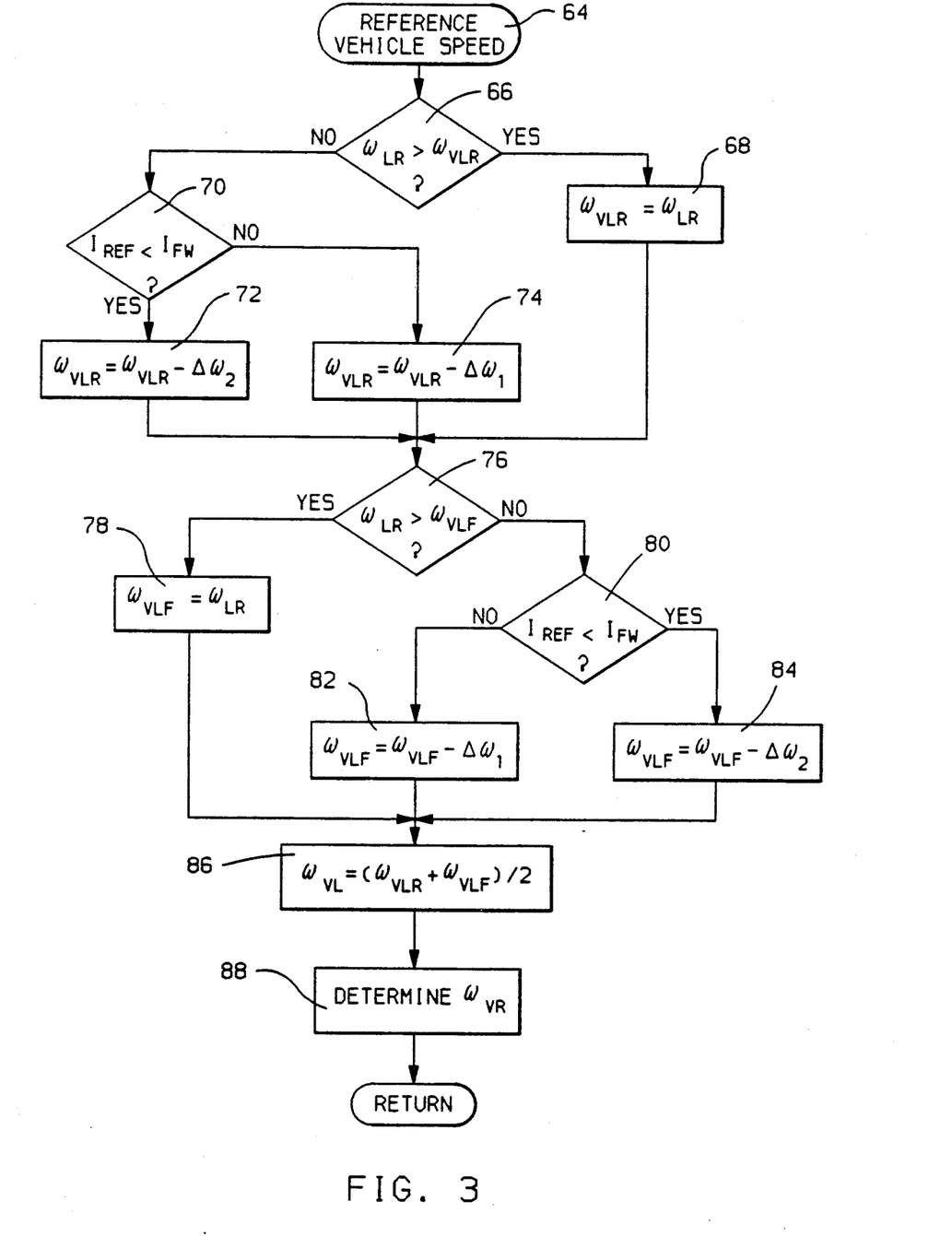

Referring to FIG. 3, the routine 52 for determining the reference vehicle speed is illustrated. In general, a separate vehicle speed reference is provided for each side of the vehicle in order to provide for an accurate representation of vehicle speed associated with each side of the vehicle while traveling through a curve on a roadway. However, the invention contemplates that a single reference vehicle speed may be determined.

The vehicle reference speed routine is entered at point 64 and proceeds to a step 66 where the left rear wheel speed $\omega_{LR}$ is compared to the reference vehicle speed $\omega_{LR}$ of the left rear side of the vehicle. Anytime that the left rear wheel speed $\omega_{LR}$ is greater than this reference vehicle speed, the left rear side reference vehicle speed $\omega_{VLR}$ is updated to the value of the left rear wheel speed $\omega_{LR}$ at step 68. As will be described, during antilock control braking, the left rear wheel 14 will be periodically free-wheeled to enable its speed to equal the vehicle speed so that $\omega_{VLR}$ established by steps 66 and 68 is an accurate representation of the vehicle speed.

Returning to step 66, when the left rear wheel speed $\omega_{LR}$ is less than the left rear reference vehicle speed $\omega_{VLR}$, $\omega_{VLR}$ is decayed at a rate to simulate actual vehicle deceleration to establish an estimate of vehicle speed. In this embodiment, the reference vehicle speed is decayed at one of two rates depending on the surface coefficient of friction on which the vehicle is being braked. This determination is made at a step 70 where a reference motor current $I_{REF}$ representing a measure of the surface coefficient at the left rear wheel 14 is compared to a surface coefficient threshold $I_{FW}$ below which the left rear reference vehicle speed $\omega_{VLR}$ is decayed at a low rate representing the maximum possible vehicle deceleration on a low coefficient of friction surface and above which the left rear reference vehicle speed is decayed at a high rate representing the maximum possible deceleration of the vehicle on a high coefficient of friction surface. As will be described, the reference current value $I_{REF}$ used at step 70 is the electric rear wheel brake 28 motor current resulting in the maximum possible braking effort between the wheel 14 and road surface. The identification of this current will be described in relation to the rear brake control routine 58 as detailed in FIG. 5. Assuming that the reference current value is less than the threshold $I_{FW}$ indicating braking on a low coefficient of friction surface, the program proceeds to a step 72 where the left rear vehicle speed reference $\omega_{VLR}$ is decayed by an amount $\Delta\omega_2$ establishing the simulated vehicle deceleration on a low coefficient surface. In one embodiment, $\Delta\omega_2$ represents a 0.65 g vehicle deceleration. If step 70 establishes that is being braked on a high coefficient of friction surface, the program proceeds to a step 74 where the left rear reference vehicle speed $\omega_{LR}$ is decayed by an amount $\Delta\omega\pm$ establishing the maximum possible deceleration on the high coefficient of friction surface. In one embodiment, $\Delta\Omega_1$ is a constant representing a 1.0 g vehicle deceleration.

After establishing the left rear wheel vehicle speed reference $\omega_{VLR}$ via steps 66-74, the program similarly establishes a left front vehicle speed reference $\omega_{VLF}$ via step 76-84. In general, the left front vehicle speed reference is established at the rear wheel speed $\omega_{LR}$ any time the left rear wheel speed exceeds the reference value $\omega_{VLF}$. As with step 70-74, steps 80-84 provide a surface dependent decay of the left front vehicle speed reference $\omega_{VLF}$ whenever the left front vehicle speed reference is greater than the left rear wheel speed $\omega_{LR}$ to provide the estimation of vehicle speed.

Once the left rear and left front vehicle speed references $\omega_{VLR}$ and $\omega_{VLF}$ are established, the vehicle speed reference $\omega_{VL}$ for the left side of the vehicle is established at step 86 by averaging the two values. By providing for periodic free-wheeling of the left rear wheel 14, the left vehicle speed reference $\omega_{VL}$ is re-established via steps 66, 68, 76, 78 and 86 at the measured vehicle speed to provide a true reference vehicle speed for the left side of the vehicle.

The foregoing steps 66-86 are repeated utilizing the parameters associated with the right side of the vehicle including the right rear wheel speed $\omega_{RR}$ and $I_{REF}$ based on the electric rear wheel brake 30 motor current to establish the right side reference vehicle speed $\omega_{VR}$. In general, the values of $\omega_{VL}$ and $\omega_{VR}$ will be equal when the vehicle is traversing a straight roadway. However, as the vehicle moves through a curve in the roadway such that the speed of the side of the vehicle on the inside of the curve is less than the speed of the vehicle on the outside of the curve, the reference speeds are adjusted to reflect that speed difference. From step 88, the routine of FIG. 3 returns to the control cycle interrupt routine of FIG. 2.

The reference speed associated with each wheel, such as the references $\omega_{VLR}$ and $\omega_{VLF}$ may be set equal to the speed of the left or right rear wheel being free-wheeled when less than the wheel speed with the single reference vehicle speed being an average of the four individual speed references including $\omega_{VLR}$, $\omega_{VLF}$ and the corresponding speed references on the right side wheels.

Figure 4:
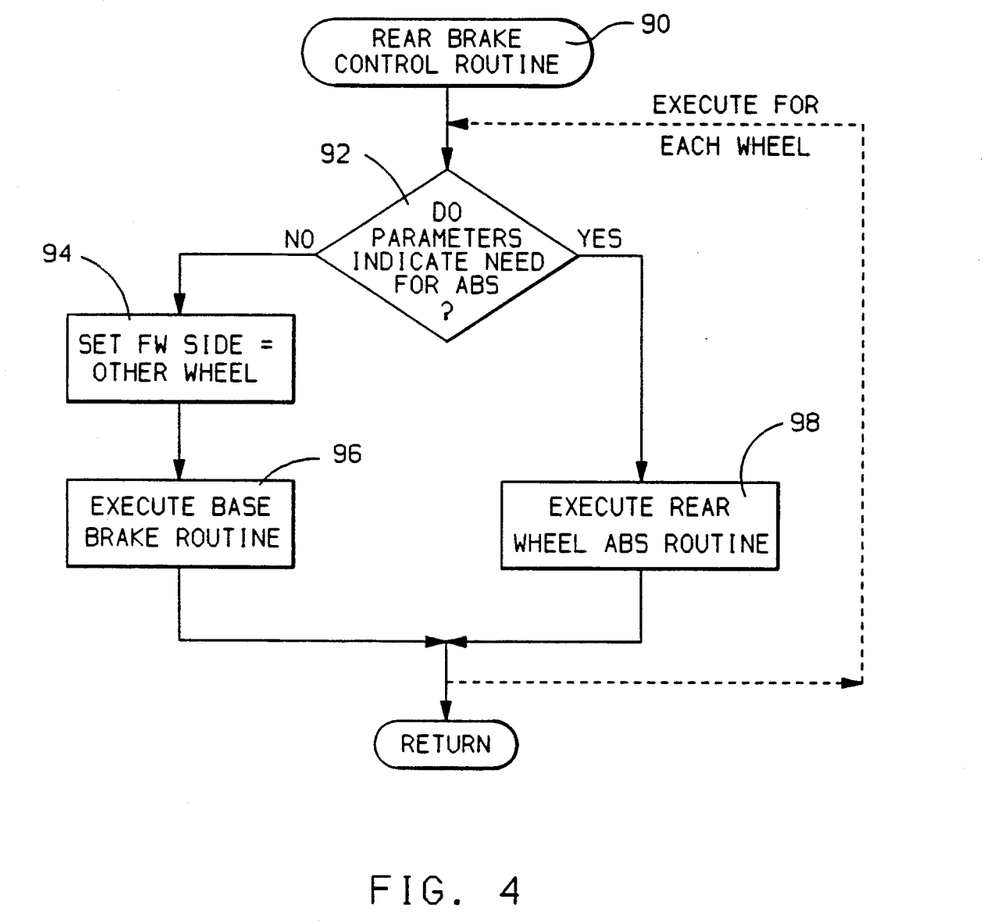

Referring to FIG. 4, there is illustrated the rear brake control routine 58 of FIG. 2. This routine provides for controlling the rear electric brakes 28 and 30 to establish a brake pressure proportional to the pressure P established by the operator applied pressure on the brake pedal 23. The routine further provides for limiting the brake pressure applied by the rear brakes 28 and 30 to prevent wheel lockup.

The routine of FIG. 4 is executed first for one of the rear wheels such as the left rear wheel 14 using the parameters and values such as wheel speed that are associated with that wheel and is then repeated for the other rear wheel using the parameters and values associated therewith. Further, the motor command control values established by the routine relate to the motor in the brake 28 or 30 of the wheel being considered.

The routine is entered at step 90 and proceeds to determine whether the parameters of the selected wheel indicate a need for antilock controlled braking to prevent wheel lockup. Assuming initially that such a condition does not exist, the program proceeds to set an indicator, representing the side of the vehicle to be free-wheeled, to the other wheel at step 94. By this step, a wheel is free-wheeled to establish a vehicle speed reference only when that wheel is experiencing antilock controlled braking. Thereafter at step 96, the base brake routine is executed to establish a motor current command for the torque motor of the wheel being considered at a value proportional to the operator established pedal pressure P. The routine is then executed for the remaining rear wheel after which the program returns to the control cycle routine of FIG. 2.

Returning to step 92, if the parameters for the wheel under consideration indicate a need for antilock controlled braking as represented by values of wheel slip and wheel deceleration, the program proceeds to execute a rear wheel antilock brake routine at step 98. It is during this routine that the brake pressure is limited to prevent wheel lockup and which provides for selective free-wheeling of the rear wheels so as to provide a measure of vehicle speed for updating the vehicle speed references. Again, upon execution of the routine 98, the routine of FIG. 4 is re-executed for the remaining rear wheel if the other wheel has not yet been considered after which the program returns to the control cycle routine of FIG. 2. The execution of the routine of FIG. 4 can provide for execution of the base brake routine 96 for one of the rear wheels while providing for antilock controlled braking of the other rear wheel) via step 98. Again, it is noted that step 94 continually sets the free-wheeling side to the side other than the one under consideration so as to limit free-wheeling to a wheel whose brake pressure is being controlled to prevent wheel lockup.

Figure 5:
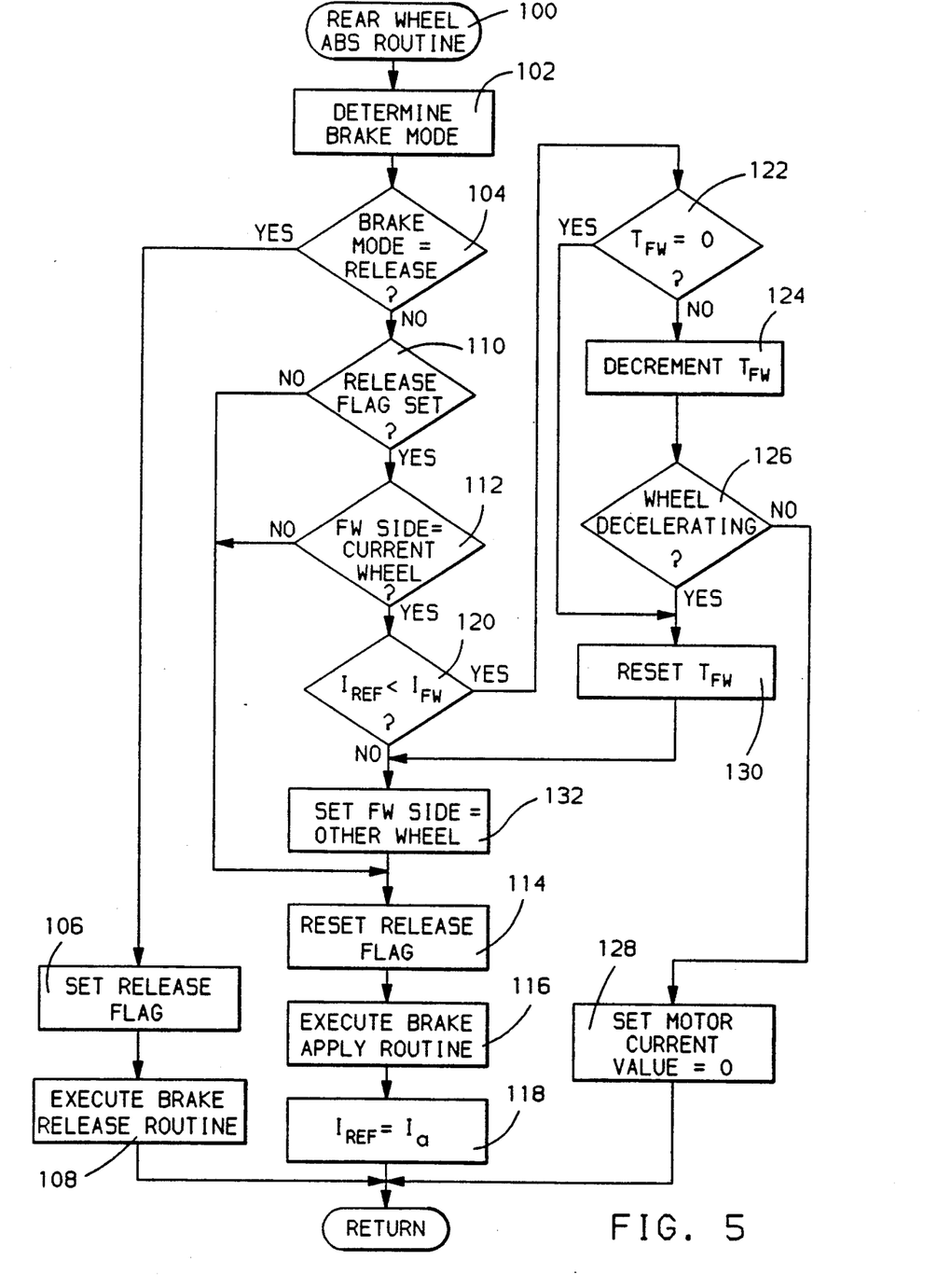

Referring to FIG. 5, there is illustrated the rear wheel antilock brake control routine 98 of FIG. 4. This routine will be executed for one or both of the rear wheels whose parameters indicate a requirement for antilock controlled braking as established by step 92 for that wheel.

The rear wheel antilock brake routine is entered at point 100 and then proceeds to a step 102 that selects the required antilock brake mode. In general, the selection is made from a number of apply modes, such as three, each having a related rate of increase in brake pressure as a function of wheel acceleration and wheel slip and one or more release modes, also as a function of wheel acceleration and wheel slip. For example, the apply modes may provide for higher rates of increase in brake pressure with increasing values of wheel acceleration and with decreasing values of wheel slip. The release modes may provide for full release with high wheel slip and high wheel acceleration values and step-down release with lower wheel slip and wheel acceleration values. It can be seen that this control is based upon the knowledge of wheel slip which is computed at step 54 of FIG. 2. In order to provide an accurate indication of wheel slip, which is based upon the difference in speed between the wheel and the speed of the vehicle, this invention provides for an accurate estimation of the vehicle speed by which the wheel slip is computed.

In this embodiment, the particular apply/release brake mode is determined via a lockup table stored in a read-only memory in the controller 32 of FIG. 1 storing the various apply and release brake modes as a function of wheel acceleration and wheel slip. The stored brake modes establish a threshold between pressure apply and pressure release as a function of wheel acceleration and wheel slip. An incipient wheel lockup condition is indicated when the table first indicates one of the brake release modes whereas a recovered condition is indicated when the lockup table first indicates one of the brake apply modes.

Step 104 then determines whether the brake mode determined at step 102 is one of the release modes indicating an incipient wheel lockup condition sensed by step 102. If a release mode in response to an incipient wheel lockup condition is indicated, the program proceeds to a step 106 where a release flag is set after which a release routine 108 is executed. The release routine 108 provides for controlling the current to the torque motor of the brake of the wheel under consideration so as to release brake pressure and allow the wheel to recover from the incipient wheel lockup condition. The foregoing steps are continually repeated as long as a release condition is indicated until such time that wheel recovery results as sensed when step 102 first indicates one of the pressure apply modes for the sensed wheel acceleration and wheel slip conditions. When this condition is determined at step 104, the program first determines whether the conditions exist for free-wheeling the wheel under consideration.

In general, the wheel is free-wheeled by removing all brake force applied thereto to enable the wheel to attain vehicle speed only when the surface coefficient of friction is low and only when the wheel brake pressure has just been released in response to an incipient wheel lockup condition and a recovery condition has just been sensed. This condition provides for free-wheeling the wheel at a point in the antilock control braking cycle where the wheel is closest to the actual vehicle speed thereby minimizing the free-wheeling time required for the wheel to attain vehicle speed. Further, since the rear wheels are alternately free-wheeled when both wheels are being braked on a low coefficient of friction surface, the routine provides for free-wheeling the wheel under consideration only if it is this wheel's turn to be free-wheeled.

When the step 104 indicates a brake apply mode, the program proceeds to a step 110 where the state of the release flag is sensed. Recalling that this flag was set at step 106 during release of the vehicle brake, step 110 will sense the set condition when the routine first senses a recovery from a incipient wheel lock condition at step 102. Assuming this is the case, the program proceeds to a step 112 where it determines whether or not it is this wheel's turn to be free-wheeled to measure vehicle speed. If not, the program proceeds to reset the release flag at step 114 after which a brake apply routine is executed at step 116 to command reapplication of brake pressure to the wheel under consideration and a step 118 is executed to identify the motor current establishing the brake pressure producing the maximum possible brake force between the wheel and road surface and therefore which establishes the critical slip value between the wheel and road surface. In general, the brake apply routine first establishes the motor current command Ia at an initial value that is a substantial fraction of a motor current value $I_{REF}$ previously identified as the motor current establishing the brake pressure producing the maximum possible brake force between the wheel and road surface and therefore which establishes the critical slip value between the wheel and road surface. During subsequent executions of the routine of FIG. 5 for that wheel, the program proceeds directly from step 110 to steps 114–118. Via repeated executions of the routine of step 116, the motor current command $I_a$ is ramped in an increasing direction to increase brake pressure.

The value of motor current $I_{REF}$ representing the motor current establishing the brake pressure producing the maximum possible brake force between the wheel and road surface and thereby establishing the critical slip value between the wheel and road surface is identified at step 118 by continually setting the value of $I_{REF}$ at the motor current value $I_a$. By continually tracking the motor current $I_a$ as step 116 ramps the motor current via repeated executions of the rear brake control routine, when an incipient wheel lockup condition is first sensed by step 102 first indicating a release mode, the value of $I_{REF}$ represents the motor current producing the brake force establishing the maximum braking effort between the wheel and road surface. It can also be seen, that the value of $I_{REF}$ when an incipient wheel lockup condition is first sensed is also a measure of the road surface coefficient of friction. For example, if the motor current resulting in an incipient wheel lockup condition is low indicating the brake force resulting in an incipient wheel lockup condition is low, a low coefficient of friction surface is indicated. Therefore, the value of $I_{REF}$ at the time of an incipient wheel lockup condition is a measure of the road surface coefficient of friction.

Returning to steps 110 and 112, if the release flag is set indicating the wheel has just recovered from an incipient lockup condition, and it is this wheel's turn to be free-wheeled to identify vehicle speed, the program proceeds from step 112 to a step 120 where the value of $I_{REF}$ is compared to the threshold value $I_{FW}$ below which a low coefficient of friction surface is indicated whereat free-wheeling is enabled and above which a high coefficient of friction surface is indicated whereat free-wheeling is disabled. Assuming that $I_{REF}$ is less than $I_{FW}$ indicating a low road surface coefficient of friction where free-wheeling is enabled, the program proceeds to sample a free-wheel time count $T_{FW}$ at step 122 that is initially set at a value representing a maximum allowable free-wheeling time. Assuming the count has not expired, the count is decremented at step 124 after which the program determines at step 126 whether or not the wheel is decelerating. It is apparent that the wheel will decelerate in the absence of braking pressure only when the wheel has attained vehicle speed and thereafter decelerates at vehicle speed. Assuming this condition does not exist, the program proceeds to a step 128 where the motor current command to the torque motor of the brake of the wheel under consideration is set to zero to establish zero brake effort. The foregoing steps are then repeated until either the time $T_{FW}$ has expired as sensed at step 122 or until the step 126 indicates the wheel is decelerating indicating that the wheel has attained vehicle speed. If either of those conditions exist, the free-wheel time $T_{FW}$ is reset to the maximum allowable value at step 130 after which the program selects the other side to be free-wheeled at step 132. Thereafter, the brake pressure is reapplied via steps 114 through 118 as previously described.

When the routine of FIG. 5 is next executed for the same wheel in response to the next control cycle interrupt, step 112 will provide for bypassing free-wheeling of the wheel and will continue to do so until such time that the other wheel is either free-wheeled after which step 132 again points to this wheel or if step 94 of FIG. 4 points to this wheel as a result of the parameters of the other wheel not indicating a need for antilock controlled braking.

Returning again to step 120, if the wheel being considered is on a high coefficient of friction surface, step 132 points to the other wheel to be free-wheeled and brake pressure is reapplied via step 114–116 as previously described. In this manner, only the wheel on a low coefficient of friction surface is free-wheeled on a split coefficient of friction surface and the wheels are alternately free-wheeled if both wheels are being braked on a low coefficient of friction surface.

By allowing the rear wheels to free-wheel and attain vehicle speed, the routine of FIG. 3 is enabled to continually update the left and right reference vehicle speeds $\omega_{VR}$ and $\omega_{VL}$ to the true vehicle speed to enable wheel slip to be accurately determined for antilock controlled braking of the vehicle wheels.

The foregoing description of a preferred embodiment of the invention for purposes of illustrating the invention is not to be considered as limiting or restricting the invention since many modifications may be made by the exercise of skill in the art without departing from the scope of the invention.

The embodiment of the invention in which an exclusive property or privilege is claimed are defined as follows:

1. A method of limiting the brake pressure applied to a brake of a wheel of a vehicle traveling over a road surface, the method comprising the steps of:
   measuring the speed of the wheel;
   comparing a reference vehicle speed that is an estimate of actual vehicle speed with the measured speed of the wheel and decaying the reference vehicle speeded at a predetermined frate when the reference vehicle speed is greater than the measured speed of the wheel and by setting the reference vehicle speed at the measured speed of the wheel when the reference vehicle speed is less than the measured speed of the wheel;
   computing wheel slip as a predetermined function of the difference between the measured speed of the wheel and the reference vehicle speed;
   sensing an incipient wheel lockup condition from predetermined parameters including the computed wheel slip;
   releasing the brake pressure applied to the brake of the wheel when the incipient wheel lockup condition is sensed to allow wheel recovery from the incipient wheel lockup condition;
   sensing recovery from the incipient wheel lockup condition;
   free-wheeling the wheel when a recovery condition is sensed by removing the brake pressure from the wheel brake to allow the wheel to attain the actual vehicle speed;
   sensing a condition where the wheel speed is equal to the actual vehicle speed; and
   reapplying the brake pressure when the condition wheel the wheel speed is equal to the actual vehicle speed is sensed, whereby the reference vehicle speed is updated to the actual vehicle speed when the wheel is free-wheeled.

2. The method of claim 1 further including the steps of:
   sensing the coefficient of friction between the wheel and the road surface and
   inhibiting the step of free-wheeling the wheel when the sensed coefficient of friction is greater than a predetermined threshold.

3. The method of claim 1 wherein the step of sensing a condition where the wheel speed is equal to the actual vehicle speed comprises sensing a deceleration of the wheel while the wheel is being free-wheeled.

4. A speed reference determining method in an antilock braking system of a vehicle having a pair of rear wheels each traveling over a respective portion of a roadway and in which brake pressure in each one of the rear wheels is individually controlled to prevent wheel lockup by cyclically releasing the brake pressure in response to a sensed incipient lockup condition of one of the rear wheels and reapplying the brake pressure following a sensed recovery of said one rear wheel from the sensed incipient lockup condition, the method comprising the steps of:

sensing the speed of each of the rear wheels;

alternately free-wheeling the rear wheels when the brake pressure in each of the rear wheels is being controlled to prevent wheel lockup to allow the speed of the free-wheeled rear wheel to attain actual vehicle speed; and comparing a reference vehicle speed that is an estimate of the actual vehicle speed with the sensed speeds of each of the rear wheels and (a) decaying the reference vehicle speed at a predetermine rate when the reference vehicle speed is greater than each of the sensed speeds of the rear wheels and (B) setting the reference vehicle speed equal to either of the sensed rear wheel speeds that is greater than the reference vehicle speed to establish the reference vehicle speed at the actual vehicle speed.

5. The method of claim 4 further including the steps of:

sensing the coefficient of friction of each respective portion of the road surface and inhibiting the free-wheeling of each one of the rear wheels when the sensed coefficient of friction of the respective portion of the road surface is greater than a predetermined threshold.

6. A speed reference determining method in an antilock braking system of a vehicle having a pair of rear wheels each traveling over a respective portion of a roadway and in which the brake pressure in each one of the rear wheels is individually controlled to prevent wheel lockup by cyclically releasing the brake pressure in response to a sensed incipient lockup condition of one of the rear wheels and reapplying the wheel brake pressure following a sensed recovery of said one rear from the sensed incipient lockup condition, the method comprising the steps of:

sensing the speed of each of the rear wheels;

alternately free-wheeling the rear wheels when the brake pressure in each of the rear wheels is being controlled to prevent wheel lockup to allow the speed of the free-wheeled rear wheel to attain actual vehicle speed; and for each one of the rear wheels, comparing the respective sensed speed with a respective reference vehicle speed that is an estimate of the actual vehicle speed and (A) decaying the respective reference vehicle speed at a predetermined rate when the reference vehicle speed is greater than the respective sensed speed and (B) setting the respective reference vehicle speed equal to the respective sensed speed when the receptive sensed speed is greater tan the respective reference vehicle speed to establish the receptive reference vehicle speed at the actual vehicle speed.

7. The method of claim 6 further including the steps of:

sensing the coefficient of friction of each one of the receptive portions of the road surface and inhibiting the free-wheeling of each one of the rear wheels when the sensed coefficient of friction of the respective portion of the road surface is greater than a predetermined threshold.

8. A speed reference determining method in an antilock braking system of a vehicle having a pair of rear wheels each traveling over a respective portion of a roadway and in which brake pressure in each on of the rear wheels is individually controlled to prevent wheel lockup by cyclically releasing the brake pressure in response to a sensed incipient lock condition of one of the rear wheels and reapplying the brake pressure following a sensed recovery of said one rear wheel from the sensed incipient lockup condition, the method comprising the steps of:

sensing the speed of each of the rear wheels;

sensing the coefficient of friction of each respective portion of the road surface;

periodically free-wheeling one of the rear wheels to periodically allow its speed to attain actual vehicle speed when (A) the brake pressure thereto is being controlled to prevent the wheel lockup and the sensed coefficient of friction of the respective portion of the road surface is less tan a predetermined threshold while either (A) the brake pressure to the other one of the rear wheels is not being controlled to prevent the wheel lockup or (B) the brake pressure to the other wheel is being controlled to prevent the wheel lockup and the sensed coefficient of friction of the respective portion of the road surface is greater than the predetermined threshold;

alternately free-wheeling the rear wheels to allow the speed of the free-wheeled rear wheel to attain the actual vehicle speed when (A) the brake pressure to each of the rear wheels is being controlled to prevent the wheel lockup and (B) the sensed coefficient of friction of each of the portions of the road surface is less than the predetermined threshold; and for each rear wheel, comparing the respective sensed speed with a respective reference vehicle speed that is an estimate of the actual vehicle speed and (A) decaying the respective reference vehicle speed at a predetermined rate when the respective reference vehicle speed is greater than the respective sensed speed and (B) setting the respective reference vehicle speed equal to the respective sensed speed when the respective sensed speed is greater than the respective reference vehicle speed to establish the receptive reference vehicle speed at the actual vehicle speed.

* * * * *